April 9, 1940.   R. W. ERDLE   2,196,258
METHOD OF MOLDING CERAMIC ARTICLES
Filed Sept. 21, 1936   2 Sheets-Sheet 1

Inventor:
Reiner W. Erdle
By Brown, Jackson, Boettcher & Dienner
Attys.

April 9, 1940. R. W. ERDLE 2,196,258
METHOD OF MOLDING CERAMIC ARTICLES
Filed Sept. 21, 1936 2 Sheets-Sheet 2
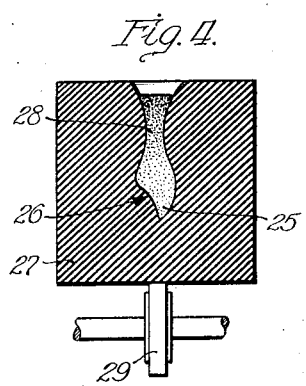
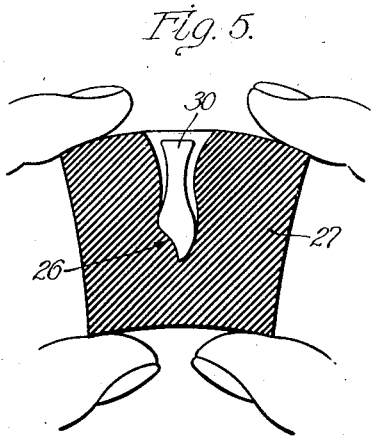
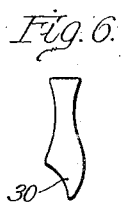
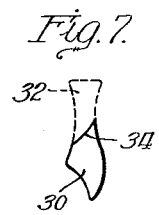
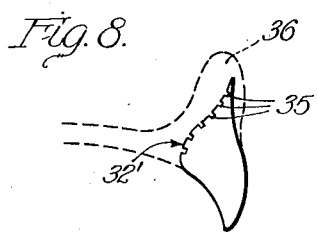
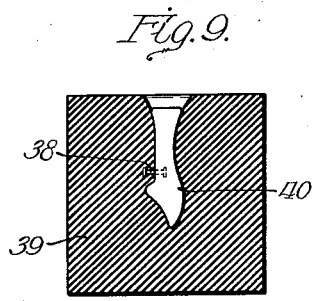
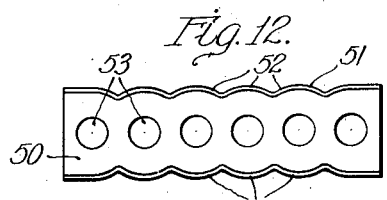
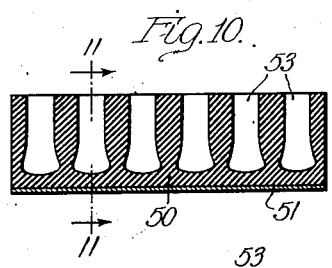
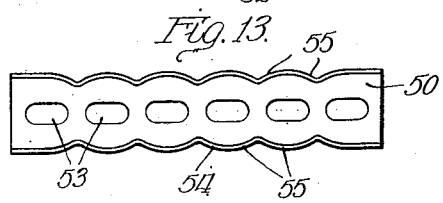
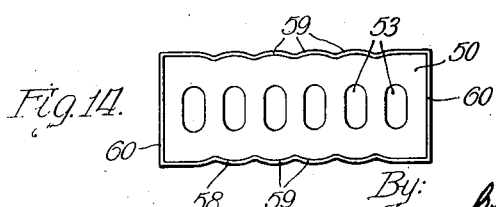
Inventor:
Reiner W. Erdle
By: Brown, Jackson, Boettcher & Dienner
Attys.

Patented Apr. 9, 1940

2,196,258

UNITED STATES PATENT OFFICE 2,196,258

METHOD OF MOLDING CERAMIC ARTICLES

Reiner W. Erdle, Chicago, Ill., assignor to Dental Research Corporation, a corporation of Illinois Application September 21, 1936, Serial No. 101,740

14 Claims. (Cl. 25—156)

My invention relates to a new and improved method of and means for making ceramic articles.

The invention is especially useful in making porcelain teeth and other porcelain denture structures. It is to be understood, however, that the invention is not limited to such use, but may be employed in making other articles as suitable or desired.

The present application is a continuation in part of my copending application Serial No. 707,303, filed January 19, 1934.

Artificial porcelain teeth have heretofore been made in rigid sectionalized molds, usually consisting of two parts and usually formed of bronze, the desired shade or shades of porcelain being placed in the mold and then compressed to the desired form by pressing the mold parts together. In removing the teeth from such molds, projecting parts and undercut portions, inserts and the like have been released by separating the mold sections.

In forming porcelain teeth and the like in rigid sectionalized molds the material is packed to the form of a firm body by pressing the mold parts together. The formation of a tooth or the like in this manner, however, has the objection that the tooth thus formed must be ground or carved by hand at the place where the mold parts meet and form a line. This has required time and effort, and has detracted from the perfection of the resulting tooth. In addition, the constant use of such a mold has required special care due to the grinding action of the porcelain which is pressed between the two halves of the rigid mold.

There are a great many different forms of teeth, varying in size and shape, and heretofore in the art it has been necessary to make each one of these different forms in a great variety of different shades of color. This makes it very expensive to put in a complete stock of porcelain teeth, which runs up the price to the dentists and restricts the handling of such complete stocks of porcelain teeth to the larger dental supply houses. As a result there are many dentists, particularly in smaller towns and in the country, who are at a great disadvantage on account of being unable to get access to the stock of dental dealers and are thereby prevented from making a proper selection of teeth as required by a particular case.

Another factor in the situation is that the production of porcelain teeth requires an extremely heavy investment because, for each size and shape of tooth, metal molds and master dies are required, and these molds are constantly wearing out and having to be replaced.

These disadvantages are all impediments to the introduction of any new style or shape of tooth on account of the tremendous expense involved.

One of the main objects of my invention is to provide a new and improved method of and means for making porcelain teeth and the like which will overcome the difficulties above outlined and, at the same time, open up possibilities for making natural looking porcelain teeth where it would be impracticable by the usual method in metal molds, due to the difficulty and expense involved.

It is a more specific object of my invention to make it possible, by a relatively small investment, for each dental laboratory, or even for the individual dentist, to obtain all the materials and equipment to produce at will, and in a very short time, any given tooth or set of teeth of a large assortment of sizes and shapes, and in any desired shade of color.

By the use of my invention I can produce a tooth having greater density and which follows faithfully the desired shape and color, and I can produce teeth with undercut and projecting parts, as well as teeth with inserts, and remove the same from the mold without making the mold in sections and separating the sections in order to permit such removal.

Sectional molds embodying certain aspects of the present invention are, however, contemplated within the scope of some of the appended claims.

With the present invention it is possible for practically any dentist or dental mechanic not only to produce teeth of a mold and shade to fill any specific requirements but also to produce teeth having any desired coefficient of expansion whereby it is possible, for example, to make teeth having the same coefficient of expansion as that of the ceramic material which is used for making the base plate.

According to the broader aspects of my invention I moisten the finely ground ceramic material, pack said material in a flexible mold to the form of a firm body by prolonged vibration, remove the body from the mold by flexing the mold, and then fire said body to give it its final hardness. Due to its flexibility the mold need not be sectionalized, but may be made to provide a mold surface which is continuous over its entire extent and without parting lines between mold sections. These molds may be made up so as to include a complete set of teeth, either upper or lower, and by securing a quantity of such molds a dental laboratory, or even the individual dentist, will have the equivalent of a large and expensive stock of teeth. Besides the flexible molds all that would be required would be a stock of ground porcelain in various shades, and the binder which is used to produce the desired set.

In its further aspects my invention employs a binder which is combined with the finely ground ceramic material and is of a character to set the material chemically or hydraulically. The particular binder that may be employed varies widely within the scope of my present invention and therefore the appended claims are drawn to cover the same broadly and also to cover specifically various binders which I have found suitable.

Another feature of my invention resides in providing a flexible mold body having one or more mold cavities and distorting said mold body to different distorted conditions to shape said one or more mold cavities to different shapes, whereby to produce with the same mold teeth not only of different shades, but also of different shapes.

Further features and advantages of the invention will be apparent from the following detailed description taken in connection with the accompanying drawings, in which:

Figure 4 is a sectional view through another mold embodying the present invention, showing one manner of packing the ceramic material to the form of a firm body in the mold cavity;

Figure 5 is a section similar to Figure 4, showing how the set ceramic article is removed from the mold by flexing the same;

Figure 6 is an elevational view of the tooth formed in the mold shown in Figure 4;

Figure 7 shows the tooth with the excess porcelain ground away in order to fit the tooth to the gum;

Figure 8 is a view showing retention means formed in the ridge lap of the tooth and, in dotted lines, the manner in which the tooth is embedded in the denture base or other tooth supporting part;

Figure 9 is a view similar to Figure 4 showing the manner of forming a tooth with retention pins or other inserts anchored therein;

Figure 10 is a longitudinal sectional view through a mold embodying the present invention, showing the same set in a metal channel;

Figure 11 is a cross section, taken on the line 11—11 of Figure 10;

Figure 12 is a top plan view of the mold shown in Figures 10 and 11, showing the corrugated form of the side walls of the channel;

Figure 13 is a view similar to Figure 12, showing the same flexible mold body in a somewhat narrower channel formed to hold the mold body elongated or stretched lengthwise to increase the dimensions of the mold cavities lengthwise of the mold with a reduction in the dimensions of said cavities laterally; and Figure 14 is a view similar to Figures 12 and 13, showing a different form of channel for holding the same mold body shown in Figures 10 to 13, inclusive, compressed lengthwise and extended transversely.

Figure 1:
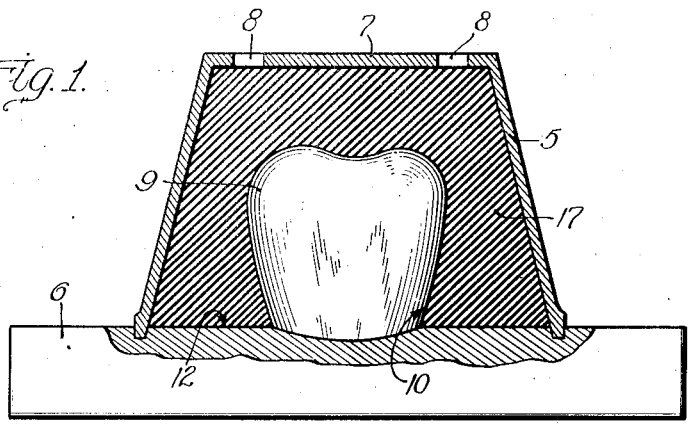
Figure 1 is a more or less diagrammatic sectional view showing one manner of making a flexible mold for use with the present invention.
Figure 2:
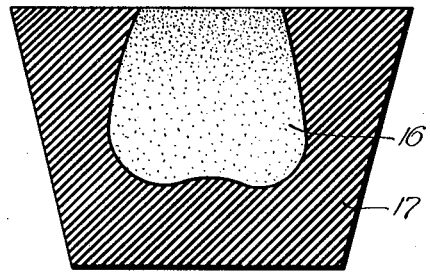
Figure 2 is a sectional view through the mold, showing one manner of molding the article therein.

In Figure 1 of the drawings I have illustrated one manner of making a flexible mold suitable for use with the present invention. The flask 5 is placed in inverted position upon a suitable base and is provided at its top with suitable openings 8. A pattern 9 of the tooth or other article to be molded is positioned upon the base 6 and within the flask 5, and the flexible mold material is poured into the flask 5 through one or more of the openings 8, completely to enclose the sides and cutting or grinding surface of the tooth and to a level substantially filling the flask. The openings 8 permit the escape of air.

The flexible material is then allowed to harden, and forms the flexible mold 17 having a mold cavity 10 shaped to form an artificial tooth or any other desired article. The inner mold surface is continuous throughout and without parting lines or the like, such as are produced by sectional molds or divided mold linings.

The flexible mold material is preferably rubber or a plasticized vinyl chloride material marketed under the name "Korojel," but it is to be understood that gelatine, glue and other suitable flexible and, preferably, resilient materials are contemplated within the scope of the present invention.

The mold cavity 10 opens from the side 12 of the flexible mold body and may be undercut inwardly of the open side as shown, or provided with other undercut or projecting parts as will hereinafter appear. Upon hardening of the mold body, the flask 5 is removed. The pattern 9 is adapted to be removed from the mold cavity notwithstanding undercut or projecting parts, by grasping the flexible mold in the hands and flexing the same in the manner shown in Figure 5 to release the pattern. Upon removal of the pattern, the resilient character of the flexible mold body springs the mold body back to its original shape, with the cavity therein as produced by the pattern 9.

Porcelain is preferably employed for forming the tooth 18, but I contemplate forming other articles and using other ceramic materials, within the scope of the broader aspects of the present invention. The porcelain or other material is preferably finely ground and, in accordance with one embodiment of the present invention, is of graduated particle size about 200 mesh and finer. Two parts of this dry finely ground material are mixed with one part of a suitable binder. Variations in the amount and character of the binder are contemplated, the foregoing proportions being suitable for making up a porcelain material for use with the present invention.

An organic silicate binder constitutes one suitable binder that may be used with the finely ground porcelain in the proportions above set forth. This particular binder may be of the character and formed as more fully set forth in United States Letters Patent No. 1,909,008, granted May 16, 1933, to Charles H. Prange, and may be used with the finely ground porcelain or other material in the manner set forth in my copending application, Serial No. 707,303, filed January 19, 1934.

One method of making an organic silicate binder which has proven to be satisfactory consists in properly treating and conditioning liquid tetra-ethyl silicate. With about eight volumes of this organic silicate I mix about one volume of water and a trace of suitable acidifying agent, e. g., a few drops of hydrochloric or sulphuric acid, thereby inducing a partial hydrolysis.

Since these liquids will not readily mix, it is preferable to add a small amount of a material which is miscible with all. For example, I prefer to add one or two volumes of ethyl alcohol or acetone whereby a true and thorough mixture of the liquid is readily produced. The amount of acid to be used will vary with requirements, but should be, preferably, just sufficient to make the mixture very slightly acid when tested with litmus paper.

The mixture is then preferably stirred on a water bath until a sample, upon drying upon the hand, for example, is sticky to the touch. Usually a period of one to two hours will suffice.

This produces the organic silicate binder heretofore referred to and having the characteristics hereinbefore mentioned. This binder may be used immediately, or it may be stocked for a reasonable period of time, to be used when required and in the manner already set forth.

The mixture of finely ground porcelain and binder is placed in the cavity 10 of the flexible mold as indicated at 16, and is then packed to the form of a firm body by prolonged vibration by suitable vibrating means such as shown at 29 in Figure 4. As illustrative of the extent of vibration preferably employed, I vibrate the material in the flexible mold until no more liquid rises to the top. This indicates substantially complete packing of the material and substantially maximum contact of the particles thereof. It is understood, of course, that this will vary considerably in actual practice.

This packing changes the liquid solid ratio of the mixture of porcelain and binder from the proportions when first made. If preferred, a relatively greater proportion of porcelain or other material may be used, in which case the plastic composition of the material and the binder may be produced by kneading it.

Upon packing the material in the flexible mold to the form of a firm body, the organic silicate binder promptly sets the material hydraulically to relatively hard condition without requiring it to be dried out and hardened by a long and time-consuming process. This mixture of ground porcelain or other ceramic material and a hydraulically setting binder, set hydraulically to hard condition, holds the molded form of the article in removing the same from the mold. This mixture and the method of setting the material hydraulically to hard condition are disclosed in my copending application herein identified, said application setting forth a variety of ways of accelerating the initial setting of the mixture which may, if desired, be employed with the present invention.

Figure 3:
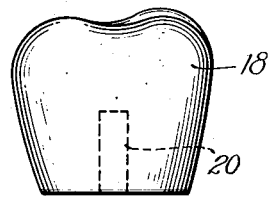
Figure 3 is an elevational view of an artificial tooth formed in accordance with the present invention.

After the material 16 has been packed, the mold may be grasped in the hand and flexed, as shown in Figure 5, to release or remove the molded article from the mold, notwithstanding undercuts or projecting parts. The molded tooth is then fire-hardened to form the finished tooth shown in Figure 3. After removal of the article from the mold 17 and after drying out and before fire-hardening, the article may be dipped in wax or lacquer and then carved, machined, drilled, or otherwise finished. As illustrative of any such operation, an opening 20 is drilled into the body of the article from the top, as shown in dotted lines in Figure 3, for the purpose of mounting or anchoring the tooth. This opening forms retention means, and may be of any other desired form, and it is to be further understood that the operation of which the drilling of this opening is illustrative may be any carving, machining, or other operation upon the article after removal from the mold 17 and before fire-hardening.

My prior application and the present invention, so far as the hydraulically setting mixture and method of that application enters into the present invention, are not limited to the use of an organic silicate binder. Any kind of material which has a chemical or hydraulic set so that it will harden promptly instead of requiring drying out and hardening by a long and time-consuming process, and which binder material is not incompatible with the ceramic mixture, may be employed. I have found, for example, that silicate of soda to which hydrochloric acid is added in amount to delay the setting action sufficiently to permit packing the moistened ceramic material in the mold to the form of a firm body by prolonged vibration and which at the same time will produce the desired chemical or hydraulic set, may be employed.

Another method of producing the desired chemical set is to combine a small amount of zinc oxide in intimate admixture with the ceramic material. If this mixture is moistened with a phosphoric acid solution, a chemical set will take place. A somewhat similar combination can be made by combining magnesium oxide with the ceramic material and using a solution of magnesium chloride for moistening. This will also set chemically. It is also possible to mix a small amount of plaster of Paris with the ceramic material which, upon moistening with water, will set hydraulically. In this case a relatively small amount of plaster of Paris may be used, and its binding action may be increased by adding a small amount of sugar, dextrin, or the like.

I have discovered that water containing a slight amount of a temporary binder, as, for instance, clay, dextrin, sugar, or the like, may be used quite satisfactorily to obtain the desired setting of the material without requiring a long and time-consuming drying and hardening process, and that plain water may be used as a binder.

The use of water as a binder is possible due to the fact that the porcelain is finely ground and the moistened material placed in the resilient mold and subjected to a prolonged jarring action, so that the material settles down in the mold and packs very tightly. After it has packed sufficiently, the mold can be flexed and the article removed. The flexible mold permits removal of an article with only a weak temporary binder such as water. Even such as article is quite strong enough to be handled, and if a little temporary binder, such as clay, sugar, or dextrin, is mixed with the water, the article becomes hard enough upon drying out so that it will stand rather rough handling. If a strong binder, such as an organic silicate binder is used, it is possible to make the articles in split rigid molds.

Another manner of securing a highly satisfactory temporary binding action is to mix less than 1% and, specifically, about $\frac{1}{10}$% boric acid with the porcelain powder. The porcelain is then moistened with water and packed compactly in the mold by prolonged vibration as herein described.

In order to provide the desired shading, which varies through the body of the tooth, whereby faithfully to follow the color of the teeth to be duplicated, the mixture of porcelain and binder may be made up in separate batches, using different shades of porcelain in the different batches. The different shades of porcelain may then be introduced into the mold cavity from the different batches to produce any desired shading of the tooth.

The present invention also contemplates forming a porcelain tooth or other ceramic article by introducing the colored porcelain into the mold cavity in dry and finely ground or powdered form. To secure the desired coloring of the tooth, the operator will introduce into the mold cavity the finely ground porcelain of the shade which is desired at the tip of the tooth, whereupon he will introduce other shades of porcelain to produce the desired shading which may vary through the body of the tooth. If the accelerator disclosed in my copending application is desired, it is preferably added to the porcelain before packing the same in the mold cavity.

The binder, as previously described, is preferably poured or otherwise introduced into the mold cavity before introducing the dry porcelain therein, and the material is packed as compactly as possible by prolonged vibration, set chemically or hydraulically to relatively hard condition, and then removed from the mold and fire-hardened.

If desired the binder may, within the scope of the present invention, be poured or added to the porcelain after the porcelain is introduced into the mold cavity.

In the case of a mold formed of glue, or gelatin, the mold cavity is preferably coated with a colloidal rubber solution such as that known in the art as "Latex." This may be applied to the surface of the mold cavity after removing the pattern therefrom, but is preferably applied to the pattern. Where the pattern is of moisture absorbing material, it is preferably saturated with a suitable acid, such as boric acid, or other rubber coagulating material, to which the rubber is then applied as by dipping, spraying, or in any other suitable manner. The mold body is then formed around the pattern, and when the pattern is removed, the rubber coating remains in place over the surface of the mold cavity. This coating isolates the mold material from the body of the article formed in the mold cavity to prevent the mold material from being affected by the material formed in the mold. A mold of glue without this coating will take up the moisture from the material formed in the mold, with deleterious effects, unless the glue has been treated with formaldehyde or alum to make it water resistant.

In Figures 4 to 8, inclusive, I have illustrated the method of and means for forming a tooth in accordance with the present invention, this showing being somewhat extended to show the manner of forming another form of retention means on the tooth.

The light colored porcelain 25 is placed in the mold cavity 26 formed in the flexible mold 27 first, and followed up by the darker shades of porcelain 28 to produce the desired shaded effects. The material is packed in the flexible mold 27 to the form of a firm body, as previously described, by vibrator means indicated more or less diagrammatically in the form of an eccentric member 29, it being understood that any suitable or preferred or special form of vibrator may be employed. The material is set preferably as herein described to relatively hard condition, and the molded tooth shown at 30 in Figures 5 and 6 removed by flexing the flexible mold body in the manner shown in Figure 5 to open the mold cavity and release the undercut or projecting parts of the tooth and permit such removal. When the article is released the mold flexes back to its original condition, by its inherent resilience. The excess porcelain is then ground away as shown in dotted lines at 32 in Figure 7, thereby forming the ridge lap 34 which fits against the gum.

The ridge lap 34 may then be coated with a mixture of glaze and shellac and irregular angular refractory grains moistened with silicate of soda or some other flux sprinkled upon the moistened surface. By then placing the tooth in the furnace and firing the same to maturity, the refractory grains are stuck tightly to the ridge lap surface of the tooth, thus providing a multiplicity of points of retention or a generally granular-like surface for securing the tooth structure to a tooth structure supporting part similar to the retention means disclosed in my copending application, Serial No. 87,951, filed June 29, 1936. This form of retention presents many advantages, as outlined in the foregoing application, and it enables the teeth to be quite closely fitted to the gum and the retention applied over just the right area. This is particularly advantageous when the space is limited, as in the case of a so-called "close bite," in which case there is often insufficient room for the metal pins used with regular teeth.

Instead of forming the retention means in the manner above outlined, the ridge lap 32' may be provided with a number of retention grooves 35 ground into that part of the tooth which goes against the ridge, as indicated in Figure 8. The dotted lines at 36 show how the tooth is embedded in the vulcanite denture base or other tooth supporting part.

In Figure 9 I have shown one manner of forming the tooth with inserts in the form of metal pins for securing the tooth to the denture base. The pins 38 or other inserts are set in recesses in the flexible mold 39, and the porcelain is introduced into the flexible mold, packed as previously set forth and set, preferably hydraulically or chemically, whereupon the tooth 40 and pins 38 or other inserts are removed as a unit by flexing the mold.

Figures 10 to 14, inclusive, show another advantage of the flexible mold which resides in its adaptability to be stretched, compressed together, or even bent or otherwise distorted, to change the shape of the mold cavity.

The mold body 50 is formed of rubber or other suitable flexible material, as heretofore described, and in this case is provided with a plurality of mold cavities 53, specifically six of such cavities. The inner surface of each mold cavity is continuous throughout. The resilient mold body 50 is provided with a metal channel 51, the sides of which are corrugated at 52 or otherwise formed to hold the mold body with the mold cavities 53 shaped as shown in Figure 12. The opposite ends of the channel 51 may be open as shown, although this may vary.

A second metal channel 54 (Figure 13), somewhat narrower than the channel 51, with its side walls corrugated or otherwise suitably shaped at 55, is adapted to hold the resilient mold body 50 compressed transversely and stretched or elongated longitudinally. When the resilient mold body is positioned in the channel 54, the mold cavities 53 are elongated longitudinally of the mold and reduced in dimension transversely of the mold body. The opposite ends of the channel 54 may likewise be open as shown, although this, too, may vary.

A third metal channel 58 (Figure 14), somewhat wider than the channel 51, with its side walls corrugated or otherwise suitably shaped at 59 and provided with closed ends 60, is adapted to hold the resilient mold body 50 compressed longitudinally and extended transversely. By positioning the resilient mold body in the channel 58, the dimensions of the mold cavities 53 longitudinally of the mold are reduced and the transverse dimensions of these cavities 53 are increased.

By variations of such holding devices for the flexible mold body, the mold cavities may be distorted to any desired shape, which reduces the number of flexible molds which must be stocked to produce a given number of different shapes of teeth.

In order to carry out the present invention I propose to obtain a variety of sets of natural teeth of different types and sizes, and to arrange them in complete sets, both for upper and lower jaws. These natural teeth may be modified slightly by carving, as required. After the natural teeth have been modified, which may be done by carving or grinding, or by adding to them dental cement or hard wax, an enlarged pattern is made and the flexible mold is made from this enlarged pattern.

The enlarged pattern may be made by means of a duplicating machine, whereby the original pattern can be reproduced to any desired degree of enlargement to take care of the shrinkage of the porcelain teeth in firing. This duplicating machine reproduces every detail and enlarges every part in proportion. Alternatively, the natural teeth may be duplicated through the medium of a flexible impression, using, for example, silica mixed with 5% ground glass instead of porcelain. Upon heating to about 2300° F. for a few hours, the silica tooth will expand about 5% (lineal expansion). This process may be repeated as many times as is necessary, and approximately 5% enlargement obtained each time.

A mold could be made up so as to include a complete set of teeth, either upper or lower, and by purchasing a quantity of such molds a dental laboratory, or even the individual dentist, would have the equivalent, as regards availability, of a large and expensive stock of teeth. Besides the resilient molds, all that would be required would be a stock of ground porcelain in various shades or colors, a vibrator and a furnace.

Another advantage which has become apparent as a result of production of teeth by the present method is that the porcelain is much denser than when made by the usual methods.

In making a porcelain tooth in accordance with the present invention I preferably place the molded and set tooth upon a tray upon removal of the tooth from the flexible mold and before fire-hardening, and apply heat to drive off the water or other temporary binder. I then place paraffin on this tray. The tooth and tray are warm and the paraffin melts and is absorbed by the porcelain tooth. This gives a very strong tooth, which is waterproof and can be machined, carved, stored, and handled without injury. Such tooth has great shelf life, which obviates the necessity for fire-hardening at once. The step of fire-hardening drives off the paraffin from the tooth.

After the tooth is removed from the flexible mold and the moisture eliminated from it as by heat in an oven, it may then be dipped in a liquid paraffin, wax, or lacquer. A quick dip permits only a slight penetration of the wax or lacquer into the porcelain tooth. A prolonged dip will cause a deeper penetration of the liquid. The wax or lacquer will combine the porcelain particles very effectively upon cooling, and if the bottom part of the tooth is ground away it is comparatively easy then to remove the porcelain on the inside of the wax or lacquer impregnated shell. It is possible, for instance, quickly to dip the dried out porcelain tooth into a lacquer, permit the lacquer to dry, remove the bottom part of the tooth and either shake or blow out all of the powdered porcelain which is on the inside of the tooth, leaving a very thin layer or shell of porcelain which is firmly held together by the lacquer. If this shell is fired it will produce a very thin-wall porcelain shell crown. This thin-wall porcelain shell crown may have quite a use in porcelain jacket crown work.

Further within the scope of this aspect of the invention, I take a very strong porcelain (a porcelain containing more than 50% clay) and wash several layers of this strong porcelain into the cavity and over the inner surface of the porcelain shell. With the porcelain shell produced as above described and the strong porcelain backing, a highly pleasing translucency is produced on the surface of the tooth, with a strong, tough, opaque backing. It is not desirable, from the standpoint of strength, to overheat a tooth porcelain which is high in Felspar. It becomes a sort of a glass which is rather brittle. On the other hand, a very desirable effect is produced from the standpoint of appearance. A tooth made as described above looks natural, and because it is backed up by a tough porcelain it is also very strong.

I have also found that instead of using temporary binders it is possible to secure sufficient binding action by using small additions of boric acid from $\frac{1}{10}$ of 1% up. Also borax, in such small amounts, will act as a temporary binder.

I have also found that by mixing approximately 5% of nepheline syenite, which is a mineral similar to Felspar, to our regular tooth porcelain and using just water as a liquid, a very good binding action is effected.

Another method of making a flexible mold is to use a plastic mixture consisting of vulcanized rubber latex and a filler, which mixture sets to a tough elastic mass upon simply drying out. It could be used somewhat similar to "Korojel" except that it is applied cold and sets by coagulation of the colloidal particles of vulcanized rubber.

A zinc chloride solution in combination with magnesium oxide and other chemically setting binders may be employed instead of the various chemically setting binders disclosed herein.

I do not intend to be limited to the precise details shown or described.

I claim:

1. The method of making a porcelain article of the class described which comprises mixing finely ground porcelain with a chemically setting binder, compacting the mixture of chemically setting binder and finely ground porcelain in a flexible mold to the form of a firm body by prolonged vibration and allowing same to set, removing the firm body from the mold by flexing the mold, and then fire-hardening said body.

2. The method of making a porcelain article of the class described which comprises moistening different shades of finely ground porcelain, progressively introducing the different shades of finely ground and moistened porcelain into a flexible mold, compacting said porcelain in the flexible mold to the form of a firm body by prolonged vibration, removing the firm body from the mold by flexing the mold, and then fire-hardening said body.

3. The method of making a porcelain article of the class described which comprises mixing separate batches of finely ground porcelain of different shades with a chemically setting binder, progressively introducing the mixtures of finely ground porcelain and chemically setting binder into a flexible mold, compacting said porcelain in the flexible mold to the form of a firm body by prolonged vibration and allowing same to set, removing the firm body from the mold by flexing the mold, and then fire-hardening said body.

4. The method of making a porcelain article of the class described which comprises mixing finely ground porcelain with a binder and moistening same, compacting said porcelain in a flexible mold to the form of a firm body by prolonged vibration, removing the firm body from the mold by flexing the mold, and then fire-hardening said body.

5. The method of making a porcelain article of the class described which comprises moistening finely ground porcelain of particle size not greater than approximately 200 mesh, compacting the moistened and finely ground porcelain in a flexible mold to the form of a firm body by prolonged vibration, removing the firm body from the mold by flexing the mold, and then fire-hardening said body.

6. The method of making a porcelain article of the class described which comprises moistening finely ground porcelain with water, compacting the moistened and finely ground porcelain in a flexible mold to the form of a firm body by prolonged vibration, removing the firm body from the mold by flexing the mold, and then fire-hardening said body.

7. The method of making a porcelain article of the class described which comprises moistening finely ground porcelain, and compacting by prolonged vibration the moistened and finely ground porcelain in a flexible mold to the form of a firm body adapted to be removed from the mold by flexing the mold and fire-hardened.

8. The method of making a porcelain article of the class described which comprises moistening finely ground porcelain, compacting the moistened and finely ground porcelain in a flexible mold to the form of a firm body by prolonged vibration, removing the firm body from the mold by flexing the mold, and then fire-hardening said body.

9. The method of making a porcelain article of the class described which comprises mixing finely ground porcelain with an organic silicate binder, compacting the mixture of organic silicate binder and finely ground porcelain in a flexible mold to the form of a firm body by prolonged vibration and allowing same to set, removing the firm body from the mold by flexing the mold, and then fire-hardening said body.

10. The method of making a porcelain article of the class described which comprises mixing finely ground porcelain with a binder of silicate of soda and a substance of a character and in amount to delay setting until the material is compacted, compacting the mixture in a flexible mold to the form of a firm body by prolonged vibration and allowing same to set, removing the firm body from the mold by flexing the mold, and then fire-hardening said body.

11. The method of making an article of the class described which comprises moistening finely ground ceramic material, and compacting by prolonged vibration the moistened and finely ground ceramic material in a flexible mold to the form of a firm body adapted to be removed from the mold and fire-hardened.

12. The herein described method of making artificial teeth which consists in producing a soft flexible mold having a mold cavity of the form desired, filling the mold with ceramic tooth material thinned with water or other suitable liquid so as to flow readily into the mold, vibrating the mold for a sufficient time properly to settle and solidify the tooth material and force the thinning liquid to the top where it can be readily removed, bringing the tooth material to the proper set, and finally removing the formed tooth from the mold.

13. The herein described method of making artificial teeth, which consists in producing a soft flexible sectionalized mold having a mold cavity of the form desired, filling the mold with ceramic tooth material thinned with water or other suitable liquid so as to flow readily into the mold, vibrating the mold for a sufficient time properly to settle and solidify the tooth material and force the thinning liquid to the top where it can be readily removed, bringing the tooth material to the proper set, and finally removing the formed tooth from the mold.

14. The herein described method of making artificial teeth, which consists in producing a soft flexible mold having a mold cavity of the form described, introducing metallic retaining means into the wall of the cavity with a part extending into said cavity, filling the mold with ceramic tooth material thinned with water or other suitable liquid so as to flow readily into the mold, vibrating the mold for a sufficient time properly to settle and solidify the tooth material and force the thinning liquid to the top where it can be readily removed, bringing the tooth material to the proper set, and finally removing the formed tooth from the mold.

REINER W. ERDLE.

CERTIFICATE OF CORRECTION.

Patent No. 2,196,258. April 9, 1940.

REINER W. ERDLE.

It is hereby certified that error appears in the printed specification of the above numbered patent requiring correction as follows: Page 6, second column, line 51, claim 14, for the word "described" read --desired--; and that the said Letters Patent should be read with this correction therein that the same may conform to the record of the case in the Patent Office.

Signed and sealed this 18th day of June, A. D. 1940.

(Seal)

Henry Van Arsdale,
Acting Commissioner of Patents.